March 21, 1967 P. J. HOGAN 3,310,357
ROTATING REFLECTOR FOR MOUNTING
IN THE SPOKES OF A WHEEL
Filed Jan. 10, 1963 2 Sheets-Sheet 1

INVENTOR.
PAUL J. HOGAN
BY Bernard E. Franz
ATTY.

INVENTOR.
PAUL J. HOGAN
BY Bernard E. Franz

ATTY.

United States Patent Office 3,310,357
Patented Mar. 21, 1967

3,310,357
ROTATING REFLECTOR FOR MOUNTING IN
THE SPOKES OF A WHEEL
Paul J. Hogan, 609 S. Main St.,
Naperville, Ill. 60540
Filed Jan. 10, 1963, Ser. No. 250,533
1 Claim. (Cl. 350—99)

This invention relates to a flashing reflector, and more particularly to a reflector for bicycle wheels.

The principal object of this invention is to provide a safety reflector for bicycles, which mounted on a wheel gives a flashing reflection from the lights of motor vehicles. Another object is to provide an ornamental device for bicycles.

These objects are achieved according to the invention, by providing a reflecting device mounted on an axle which is attached to a wheel of the bicycle, with fins on the device arranged so that as the wheel rotates the air flow about the fins causes the device to rotate on its axle. In a preferred embodiment the device is a reflective star, and the axle is inserted between two spokes of the wheel. There is thus provided an orbiting safety star with many reflecting surfaces.

Figure 2:
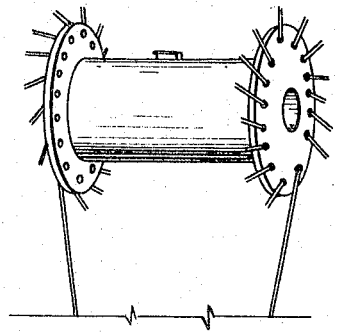
Figure 2:
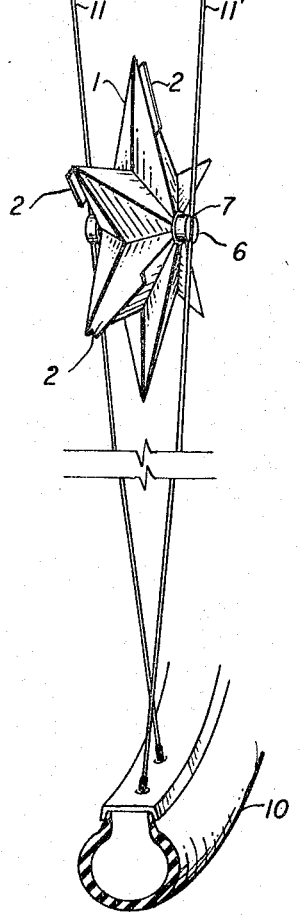
Figure 1:
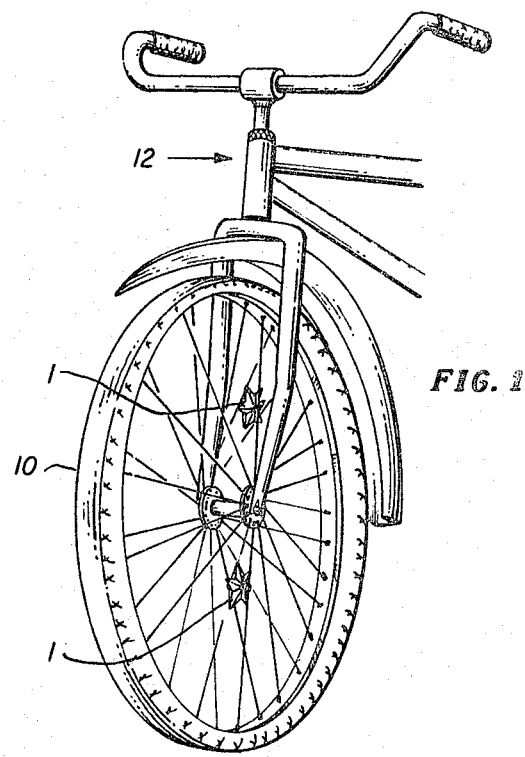
Figure 3:
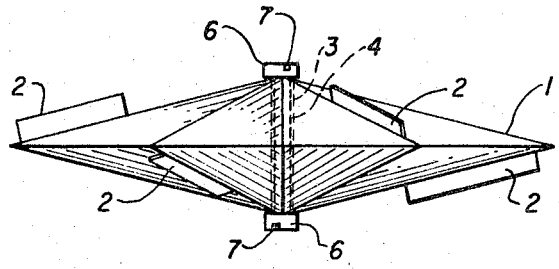
Figure 4:
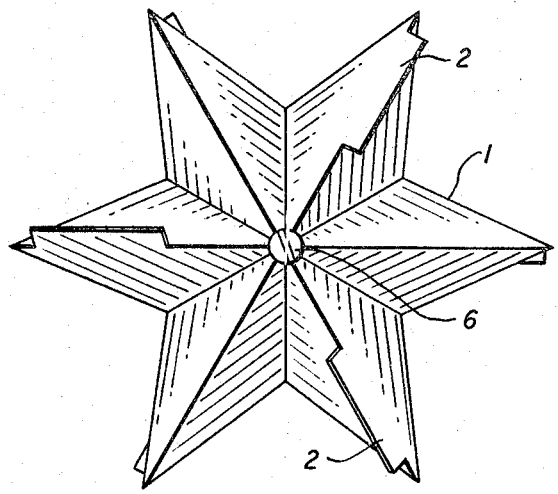
Figure 5:
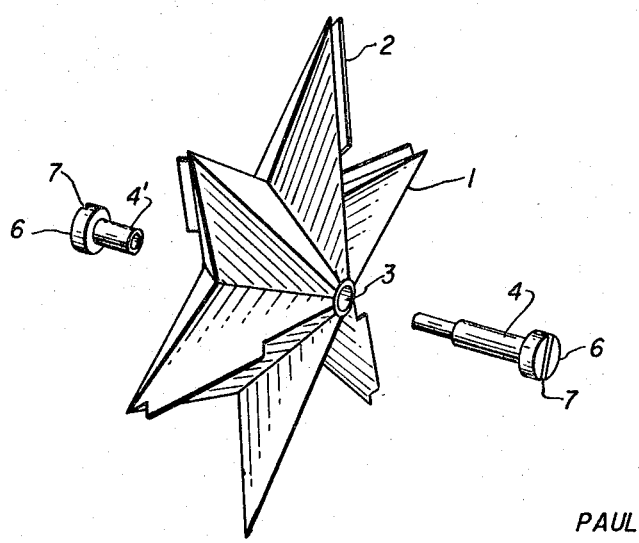

The above-mentioned and other objects and features of this invention and the manner of attaining them will become more apparent, and the invention itself will be best understood, by the reference to the following description of an embodiment of the invention taken in conjunction with the accompanying drawings comprising FIGS. 1 to 5 wherein;

FIGS. 1 and 2 are pictorial views showing the safety star mounted between the spokes of a bicycle; and FIGS. 3, 4, and 5 are top, side and pictorial views respectively of the star assembly.

The orbiting safety star 1 is shown in FIGS. 1 and 2 mounted between spokes 11 and 11' of a wheel 10 of a bicycle 12. As the bicycle moves and the wheel 10 rotates, the air flow about fins 2 causes the star 1 to rotate on its own axis. Viewed from the left as shown in FIG. 1, as the bicycle moves forward the wheel 10 rotates counterclockwise and the star rotates clockwise.

Additional stars may be mounted on the wheel 10, or on both wheels to add to the safety qualities and decorative effects.

The star assembly is shown in more detail in FIGS. 3 to 5. The main body 1 is a six-pointed star symmetrical about a plane perpendicular to its axis. Each point carries one of the fins 2 on what is a trailing edge as the star rotates. The fins on adjacent points are on opposite sides of the plane of symmetry. Each fin lies generally in the same plane as one of the surfaces and forms an extension thereof. The fin may be integral with this surface, or it may be a separate piece attached to the surface by adhesive or other means. The fins are so arranged as to create a minimum amount of drag and a maximum amount of air resistance, so that they provide a spinning motion when the wheel is in forward motion.

To obtain maximum effectiveness of the fins and thereby produce good rotating motion, the star should be of light weight and should have very good balance. Also the friction should be kept to a minimum.

The star is preferably hollow. One method of making it is to stamp two pieces from a sheet of light polished metal, to form the two halves with respect to said plane of symmetry, and then attach them together. Another method is to mold the star in solid form from light material and then plate it with light reflecting material.

A cylindrical sleeve 3 is inserted through the center of the star. This sleeve has bearings for the axle. The axle 4 is shown in FIG. 5 as two parts which can be inserted after the star is completed. This two part construction also serves another purpose, the slots 7 of the hubs 6 can be adjusted to fit and align with the spokes. The seam of the axle where the two parts join should be away from the areas where the bearings of the star ride on the axle. Very careful attention should be paid to the construction of the axle assembly and the bearings in the sleeve 3 with the idea in mind of reducing friction as much as possible. The minimization of friction here greatly increases the efficiency of the star. Low friction may be obtained by using a nylon axle 4, and metal bearings.

The grooves 7 are offset from the axis of the axle, and are non-parallel to each other, to correspond to the angles of two spokes, as shown in FIG. 2. The slots 7 should have slightly concave sides so as to provide better gripping qualities when snapped on to the spokes.

Note that each point of the star has four surfaces, two on each side of the plane of symmetry, and that these surfaces are at different angles. These surfaces reflect light rays of any source, whether day or night. As the star rotates, flashing reflections are obtained.

The assembly can also be used in positions other than between the wheel spokes. For example it could be mounted on the hub of a wheel, or other places on a vehicle. However the star should be mounted with said plane of symmetry vertical and in the direction of motion.

While I have described above the principles of my invention in connection with specific apparatus, it is to be clearly understood that this description is made by way of example and not as a limitation to the scope of my invention.

What is claimed is:

A reflector for mounting between two spokes which are connected to opposite ends of the hub of a bicycle wheel,
said reflector comprising:
an axle having grooves on the ends thereof for mounting it between said two spokes, with its axis parallel to the axis of the wheel, the grooves being offset from the axis of the axle and non-parallel to each other to correspond to the angles of the respective spokes,
a body with a cylindrical opening mounted with the axle through said opening, a plane of symmetry perpendicular to the axis of said opening, a plurality of intersecting light-reflecting surfaces, half of said surfaces lying entirely on one side of said plane and the other half on the other side, with the surfaces on one side converging to one end of said opening and the surfaces on the other side converging to the other end of the opening, the body being star shaped with each point comprising four of said surfaces.

two on each side of said plane, with each surface generally triangular, a plurality of fins, one on each point of the star, with adjacent points having their fins on opposite sides of said plane, with each of the fins lying generally in the same plane as one of the surfaces and forming an extension thereof, and with all of the fins pointing in the same direction with respect to a circle around said opening, so constructed and arranged that as the bicycle moves the air flow about the fins causes the body to rotate on its axle in a direction counter to the rotation of the wheel, whereby flashing reflections are obtained from said surfaces.

References Cited by the Examiner

UNITED STATES PATENTS

| | | | |
|---|---|---|---|
| 1,089,003 | 3/1914 | Mayerle | 88—78 X |
| 1,989,515 | 1/1935 | Harms | 88—1 X |
| 2,098,450 | 11/1937 | Exline et al. | |
| 2,191,388 | 2/1940 | Hicks | 88—81 |
| 2,344,542 | 3/1944 | Fike | 88—81 |
| 2,642,777 | 6/1953 | Bradler | 88—81 |
| 2,701,540 | 2/1955 | Hamilton | 88—81 X |
| 2,797,621 | 7/1957 | Gladen | 88—81 |

FOREIGN PATENTS 52,649   11/1935   Denmark.

JEWELL H. PEDERSEN, *Primary Examiner.*

O. B. CHEW, *Assistant Examiner.*